US009424022B2

(12) United States Patent
Arnold et al.

(10) Patent No.: US 9,424,022 B2
(45) Date of Patent: Aug. 23, 2016

(54) METHOD FOR UPDATING FIRMWARE OF AN ELECTRONIC DEVICE WITHIN A COMPUTER

(71) Applicant: LENOVO (SINGAPORE) PTE. LTD., Singapore (SG)

(72) Inventors: Alan F. Arnold, Durham, NC (US); Takashi Sugawara, Tokyo (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 14/549,899

(22) Filed: Nov. 21, 2014

(65) Prior Publication Data

US 2015/0143098 A1  May 21, 2015

(30) Foreign Application Priority Data

Nov. 21, 2013 (JP) ................. 2013-240835

(51) Int. Cl.
*G06F 9/44* (2006.01)
*G06F 9/445* (2006.01)

(52) U.S. Cl.
CPC ............. *G06F 8/665* (2013.01); *G06F 9/4406* (2013.01)

(58) Field of Classification Search
CPC ............ G06F 8/665; G06F 8/65; G06F 8/67; G06F 8/68; G06F 9/4406

USPC .................................................. 717/168–173
See application file for complete search history.

(56) References Cited

U.S. PATENT DOCUMENTS

| 2014/0059278 A1* | 2/2014 | Schuh ................. G06F 12/0246 711/103 |
| 2014/0189673 A1* | 7/2014 | Stenfort ................. G06F 8/665 717/170 |

FOREIGN PATENT DOCUMENTS

| JP | 2000148465 A | 5/2000 |
| JP | 2001075810 A | 3/2001 |
| WO | 2012-170521 A2 | 12/2012 |

* cited by examiner

*Primary Examiner* — Anna Deng
(74) *Attorney, Agent, or Firm* — Antony P. Ng

(57) ABSTRACT

A method for updating firmware of a hard disk drive (HDD) within a computer. In order to use the firmware that has been updated without rebooting the computer, the old identification information of the old firmware is loaded into a random-access memory (RAM) of the HDD. The new firmware containing new identification information is written in the non-volatile memory of the HDD during a power-on state of the computer. The new firmware containing new identification information is loaded into the RAM, and the new identification information is rewritten with the old identification information. The old identification information at the RAM of the HDD is sent back in response to a request of identification information from the operating system prior to cold boot.

14 Claims, 10 Drawing Sheets

METHOD FOR UPDATING FIRMWARE OF AN ELECTRONIC DEVICE WITHIN A COMPUTER

PRIORITY CLAIM

The present application claims benefit of priority under 35 U.S.C. §§120, 365 to the previously filed Japanese Patent Application No. JP2013-240835 with a priority date of Nov. 21, 2013, which is incorporated by reference herein.

BACKGROUND OF THE INVENTION

1. Technical Field

The present invention relates to firmware in general, and particularly to a method for updating firmware of a hard disk drive within a computer in a power-on state.

2. Description of Related Art

Electronic devices, such as hard disk drives (HDDs) and solid state drives (SSDs), commonly store a program code named firmware in a non-volatile memory (NVRAM). Such firmware is updated as needed by the manufacturer of the electronic devices, and so a user is required to update old firmware with new firmware that is acquired through a network or a recording medium. One update method is performed under the operating environment of a disk operating system (DOS). In another update method, after a NVRAM is updated under the operating environment of the operating system (OS) as well, old firmware executed by a volatile memory, such as a dynamic random access memory (DRAM), is continued until the next reboot, and after the reboot, new firmware is executed.

A HDD can be configured to load firmware stored in a NVRAM into a built-in DRAM at the time of power-on reset (hardware reset) or CPU reset (software reset) to enable the CPU to execute the firmware. The OS issues a command at the process of cold boot to let the computer transition from the power-off state to the power-on state, thus acquiring identification information of an electronic device implemented in the computer at that time.

For instance, the OS issues an IDENTIFY DEVICE command specified by Advanced Technology Attachment (ATA) to acquire information from a HDD to specify the HDD, such as a model name, version, an updating date, serial number, or capacity. Such a group of information to specify an electronic device is called identification information hereinafter. When the computer finishes cold boot, the OS recognizes that the electronic device specified by the identification information and implements the firmware before updating is connected.

If trouble happens in the HDD during the operation using an application program running under the operating environment of the OS, a user may update firmware. Although the user wishes to update the firmware soon to use the HDD, the above-mentioned two conventional updating methods cannot meet such a request. When firmware is updated in the power-on state, the HDD itself resets the CPU immediately, and loads the updated firmware into the DRAM for execution. This is called activation. When being activated, the HDD operates in accordance with the updated firmware.

In the case of Windows® OS, the OS may issue an ATA command of IDENTIFY DEVICE during the power-on state, and acquire identification information from an electronic device, such as a HDD, implemented in the computer. If the firmware has been updated, the electronic device sends back the identification information of the updated firmware that is loaded in the DRAM in response to the ATA command from the OS. Then, the OS compares the received identification information with identification information before the update that is acquired during the cold boot process. If they do not agree, the OS will think that a new electronic device is running without cold boot being performed first, and displays a "blue screen."

The "blue screen" is a screen that, in response to an occurrence of a fatal error in the OS, displays an error message in white letters on a blue background screen after the computer system has been stopped. When the "blue screen" is displayed, the user has to shut down the system forcibly for recovery in many cases, or the system may shut down automatically. In either case, if the "blue screen" occurs, any data that is not saved at the time will disappear.

When cold boot is performed after shut down, the OS acquires the latest identification information of firmware that is updated during the cold boot. After that, blue screen will not be displayed because the identification information acquired during the cold boot and the identification information acquired in the state of power-on agree. However, there is a user's demand to, under the operating environment of an OS that does not permit the continuous execution of firmware that is updated in the power-on state without performing cold boot, operate an electronic device with the updated firmware immediately after the firmware update has taken place in the power-on state.

Consequently, it would be preferable to provide an improved method for enabling a computer to use an updated firmware without performing cold boot after the firmware has been updated during the power-on state.

SUMMARY OF THE INVENTION

In accordance with a preferred embodiment of the present invention, in response to a receipt of new firmware containing new identification information from a computer in a power-on state, updating old firmware in a non-volatile memory of the electronic device with the new firmware, storing the old identification information associated with the old firmware in a random-access memory of the electronic device, and executing the new firmware. In response to a request of identification information from an operating system before cold boot of the computer, sending the stored old identification information from the random-access memory to the operating system.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Configuration of Hardware and Software of Computer

Figure 1:
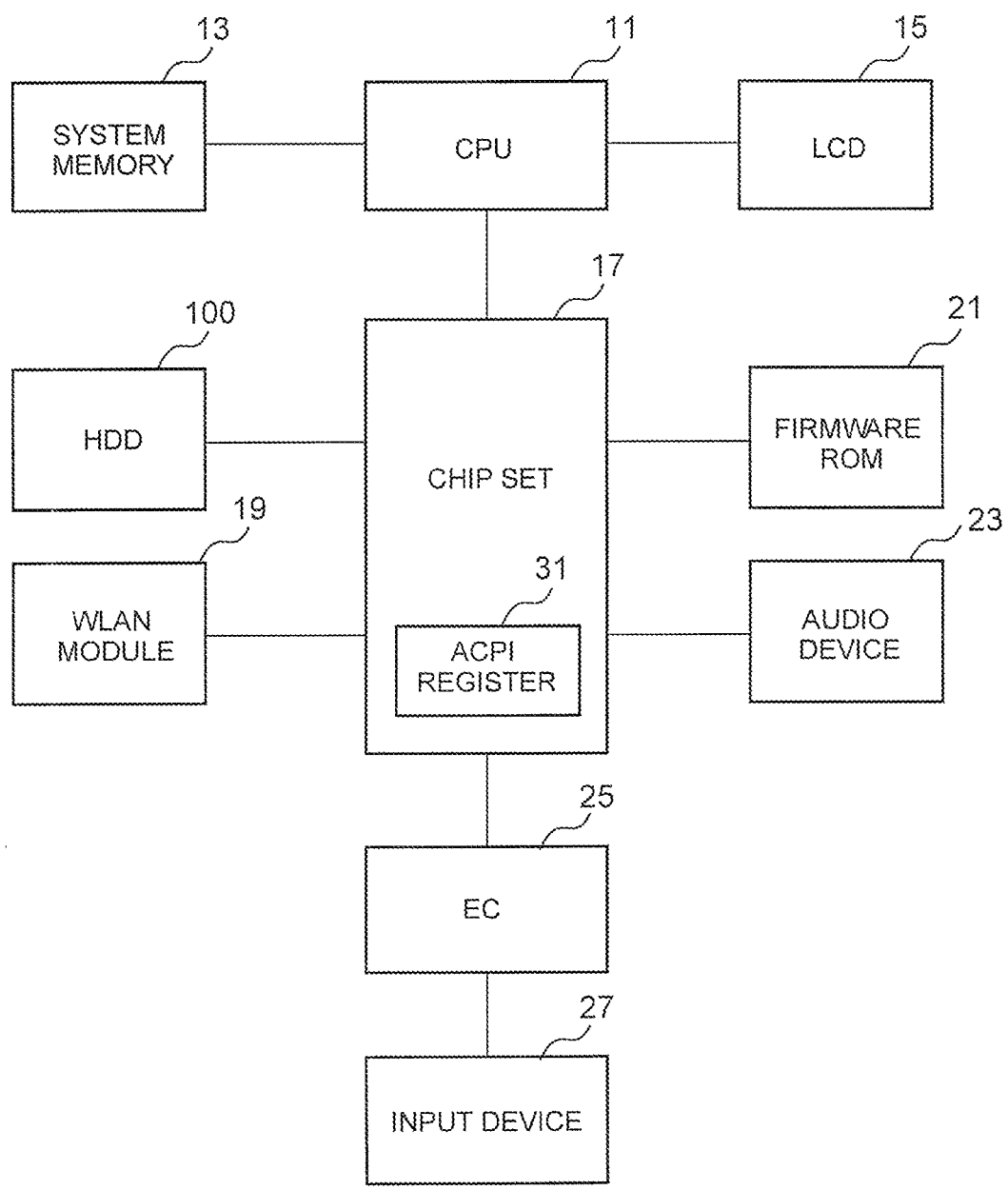
FIG. 1 is a functional block diagram of a computer.
Figure 2:
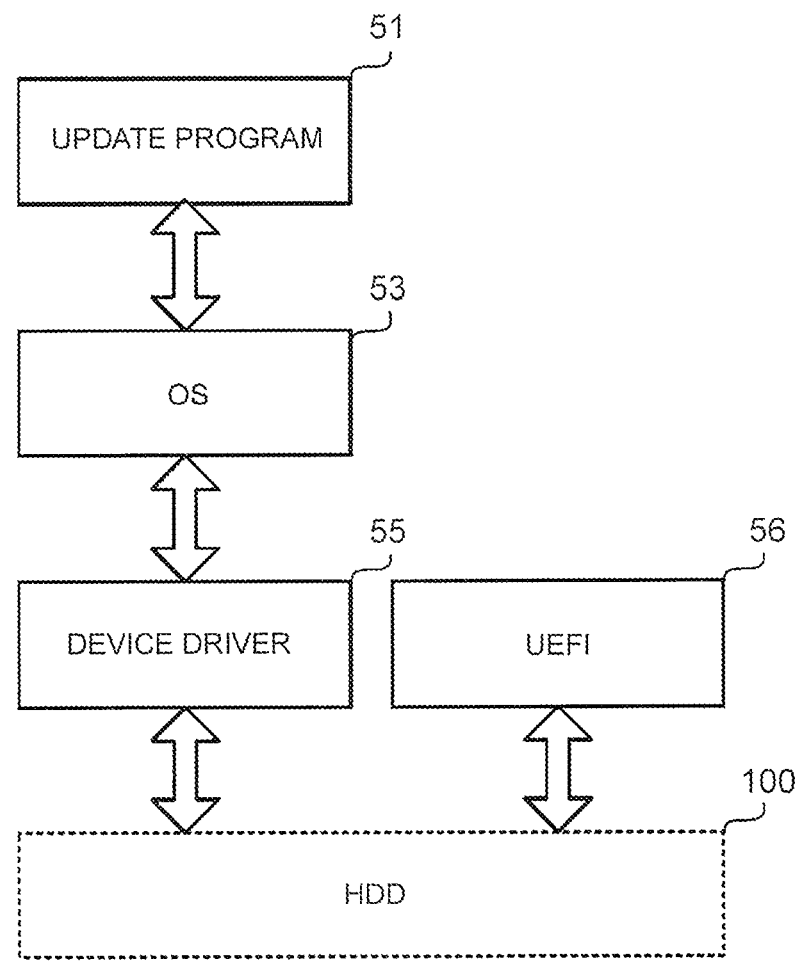
FIG. 2 is a functional block diagram of the software configuration of the computer from FIG. 1.

FIG. 1 is a functional block diagram of a computer 10. FIG. 2 is a block diagram of the software configuration that functions to allow the computer 10 to update firmware of a HDD 100. Since the configuration of many hardware components and software components is known, the following describes the range necessary to understand the present invention. To begin with, power states of the computer 10 are described. The computer 10 has power-saving functions of Advanced Configuration and Power Interface to (ACM, The ACPI defines four sleeping states (power-saving states) from S1 state to S4 state, S0 state (power-on state) and S5 state (power-off state).

Among the sleeping states of ACPI, the computer 10 in one example defines S3 state (suspend state) and S4 state (hibernation state) only, but may define other sleeping states. In the power-off state and the sleeping states, the power supply of a CPU 11 and the HDD 100 always stops, and at the time of rebooting, power-on reset is performed. In the suspend state, the content stored in a main memory 13 is held, and the power supply of devices that are not necessary to hold the content stored in the main memory 13 and to boot the power supply of the computer 10 stops.

The hibernation state takes the longest time to boot the computer among the sleeping states supported by ACPI, and consumes the least amount of electricity. For transition from the power-on state to the hibernation state of the computer 10, the OS stores hibernation data stored at a system memory 13 in a hibernation area of the HDD 100 or the like, and then stops the power supply of devices other than devices necessary to boot the power supply.

The power-off state is called soft-off as well, and basically has the same range to supply electricity to devices as that of the hibernation state other than that the OS does not store the hibernation data in the HDD 100 or the like. Herein, the hibernation state of the present invention includes a power state where the Unified Extensible Firmware Interface (UEFI) automatically makes the computer transition to the hibernation state when predetermined time has elapsed from the transition to the suspend state by the OS. In this case, although the OS recognizes the state of the system as transitioning to the suspend state, the actual power state is a hibernation state.

The computer 10 in the power-on state may have other power states including run time D3 that minimizes the power consumption of the processor and lets a specific electronic device including the HDD 100 transition to the power-off state or a is runtime idle state detection, When a power state other than the power-off state and the power-on state is executed, the HDD 100 may be power-on reset after the firmware is updated and the system may not perform cold boot in some cases.

A platform control hub (PCH) 17 configured as a chip set is connected to the CPU 11, a wireless LAN module 19, the HDD 100, a firmware ROM 21, an electronic device such as an audio device 23, and an embedded controller (EC) 25. The CPU 11 is connected to a system memory 13 and a LCD 15.

The PCH 17 is equipped with interface functions for various specifications, and FIG. 1 shows a case where the HDD 100 is connected to a SATA controller, the wireless LAN module 19 is connected to a PCIe controller, the firmware ROM 21 is connected to a SPI controller, the audio device 23 is connected to a HDMI® controller, and the EC 25 is connected to a LPC controller.

The firmware ROM 21 is a non-volatile memory that stores content in an electrically rewritable manner and stores a UEFI 56 made up of a plurality of code groups. The UEFI 56 is system firmware of new specifications that is developed by the UEFI forum and is to be used instead of BIOS or in addition to BIOS. The UEFI 56 is always executed firstly when the CPU 11 is power-on reset to let the computer 10 resume from the power-off state or the sleeping state to the power-on state.

The UEFI 56 executes POST before resumption that inspects alteration of its own codes, performs password authentication, or initializes the device. For resumption, the UEFI 56 can change the content of the POST in accordance with the power state before transition. For instance, for resumption from the power-off state, the UEFI acquires parameters from all devices and executes complete POST to set the parameters at the interface. For resumption from the hibernation state, the UEFI leaves the POST of some devices to an OS 53 or restores a parameter set before to the interface so as to shorten the POST duration. For resumption from the suspend state, the UEFI executes simpler POST so as to end it in a short time.

Hereinafter, resumption of the system from the power-off state is called cold boot, and resumption of the system from the hibernation state or the suspend state is called warm boot. The cold boot can be said a booting method of focusing on the safety of the system and its reliable operation because the UEFI 56 executes complete POST before booting, and the warm boot can be said a booting method of focusing on a shorter resume duration instead of the safety and reliability of the system compared with the cold boot.

The OS 53 acquires identification information of an electronic device attached to the computer 10 during the cold boot. If the OS detects exchange of a specific electronic device including the HDD 100 before shifting to the power-off state or update of the firmware, the OS displays blue screen. When the cold boot ends in the state of the specific electronic device having the updated firmware being connected, the OS 53 acquires identification information of the electronic device and permits the operation during the cold boot.

The PCH 17 includes an ACPI register 31. The ACPI register 31 receives electricity supplied during the power-off state and the sleeping state as well. The ACPI register 31 corresponds to a SLP_TYP register and a SLP_EN register specified by the ACPI. The ACPI register 31 is set by the OS 53 when the system transitions from the power-on state to the power-off state or the sleeping state. When the preparation to let the system transition to the power-off state or the sleeping state is completed, the OS 53 sets the power state after transition at the ACPI register 31. When the power state after transition is set at the ACPI register 31, the PCH 17 makes the computer 10 transition to the set power state via the EC 25.

Before resumption from the power-off state or the sleeping state, the UEFI 56 refers to the ACPI register 31, and determines the execution path of POST in accordance with the power state before the transition. When the power state before the transition is the power-off state, the UEFI 56 selects the execution path of cold boot, and when it is the suspend state or the hibernation state, the UEFI selects the execution path of warm boot.

The EC 25 is a microcomputer including a CPU, a ROM, a RAM or the like. The EC 25 is able to execute a program relating to the management of the operating environment internal of the computer 10 independent of the CPU 11. The EC 25 controls the operations of a DC/DC converter, a charger of a battery pack, a radiator fan, which are not illustrated, and the like. The EC 25 includes an input controller, and is connected to an input device 27 such as a keyboard or a pointing device.

In FIG. 2, an update program 51 is an application program that runs while receiving a service of the OS 53. The update program 51 issues an ATA command such as DOWNLOAD MICROCODE to update old firmware of the HDD 100 with new firmware that is received via the WLAN module 19 or is received via a recording medium during the power-on state of the computer 10.

The OS 53 may be Windows<< as one example, which is not a limiting example as long as it is an OS that displays blue screen in the case of the power-on updating defined by the present embodiment. Herein the power-on updating refers to the operation where, during the power-on state of the computer 10, old firmware stored in a NVRAM 105 (FIG. 3) of the HDD 100 is updated with new firmware while keeping the HDD 100 connected, and then the firmware is activated before the computer 10 shifts to the power-off state. The old firmware of the NVRAM 105 may be left or overwritten for the updating. A device driver 55 is a program to control the operation of the HDD 100.

II. Configuration of HDD

Figure 3A:
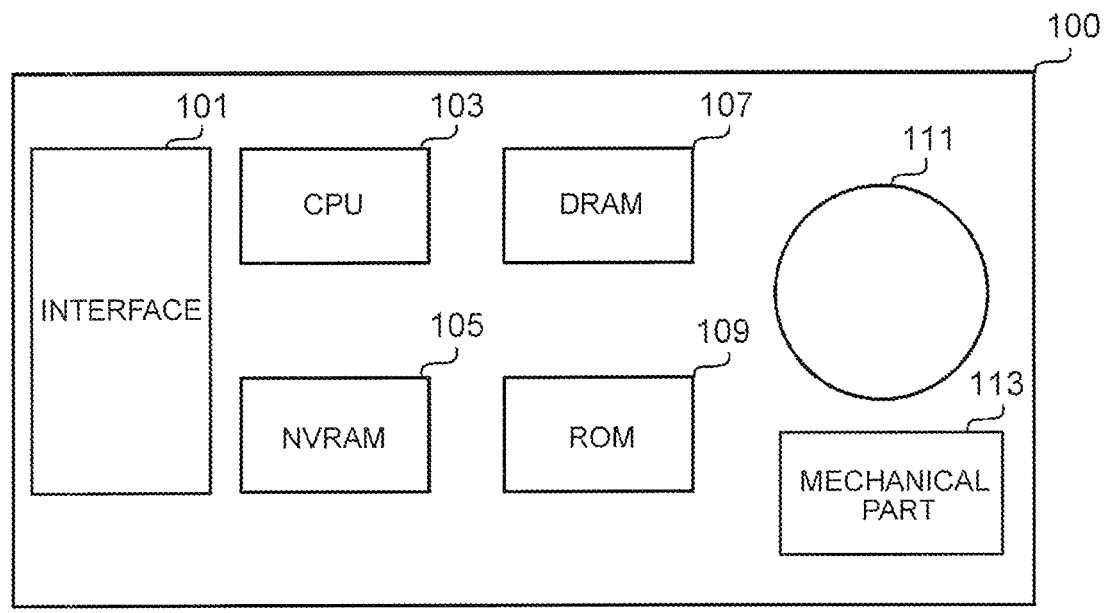
FIGS. 3A and 3B describe the configurations of a hard disk drive.
Figure 3B:
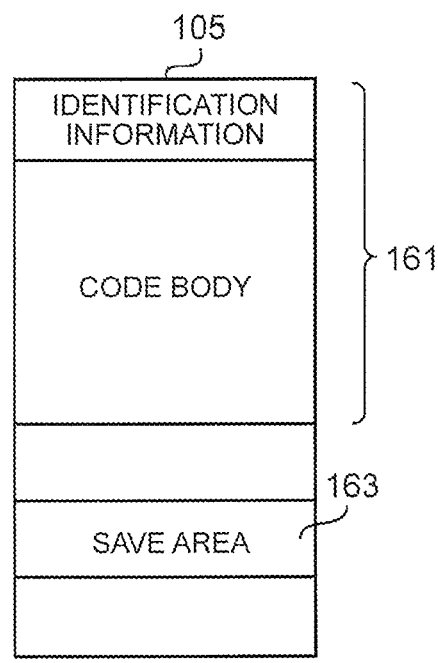

FIGS. 3A and 3B describe the configurations of the HDD 100. FIG. 3A illustrates the overall configuration of the HDD 100 and FIG. 3B illustrates the data configuration of the NVRAM 105. The HDD 100 includes SATA interface 101 connected to the PCH 17, a CPU 103, the NVRAM 105, a DRAM 107 into which firmware is loaded, a ROM 109 to store a microcode that is executed firstly when the CPU 103 is reset, a magnetic disk 111, and a mechanical part 113 such as a suspension and a spindle motor. Since the configuration of these hardware components is known, their descriptions are omitted.

The magnetic disk 111 stores the software illustrated in FIG. 2. The HDD 100 is a boot drive that stores a boot file that is loaded when the computer 10 boots. The NVRAM 105 has a firmware area 161 that stores identification information and a code body making up firmware to be updated. A save area stores old identification information of old firmware when the firmware is updated. The identification information and the code body making up firmware to be updated may be stored in the ROM 109 or the magnetic disk 111. The updating of firmware according to the present invention is applicable to a SSD instead of the HDD 100.

III. Update Method 1

Figure 4:
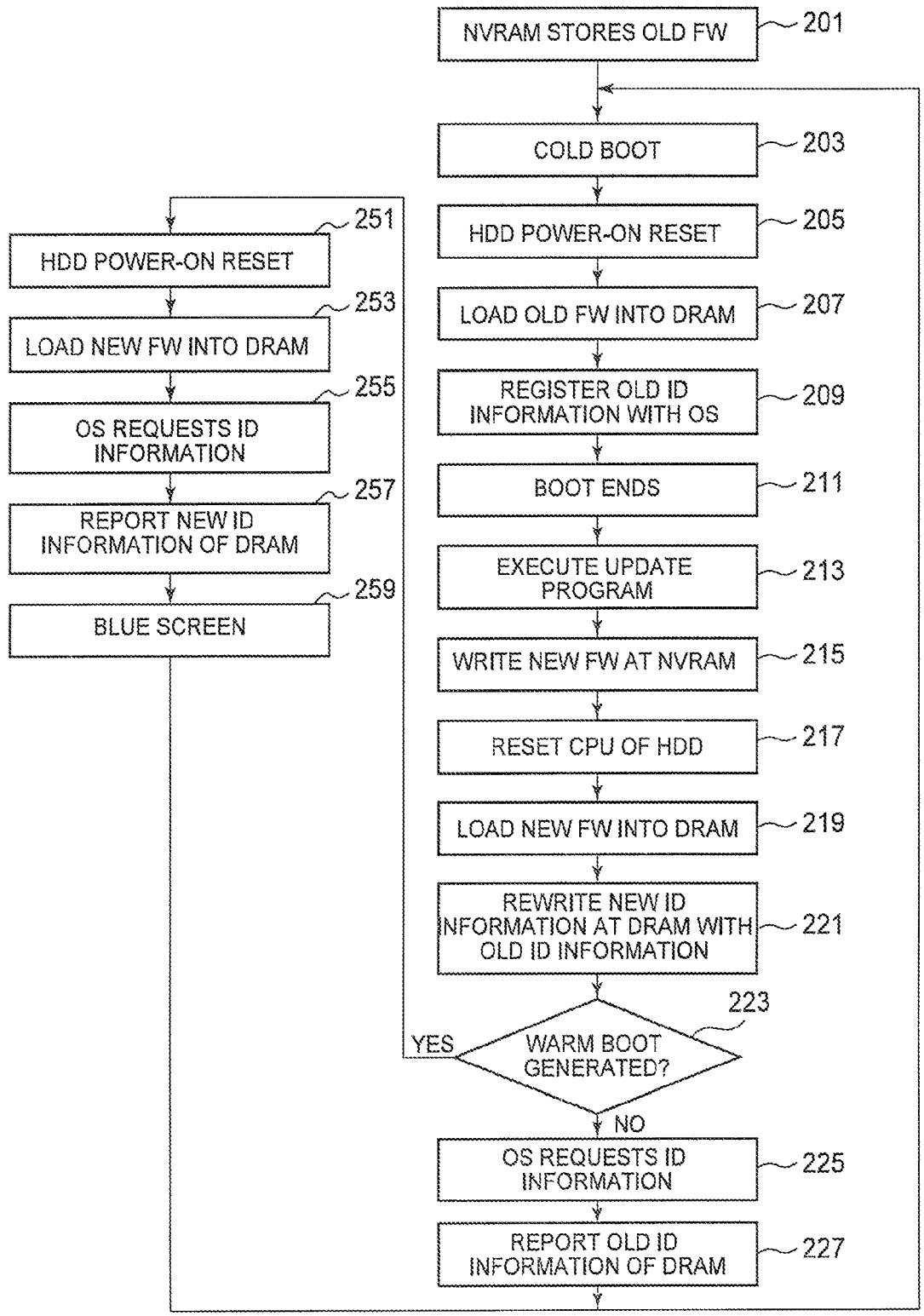
FIG. 4 is a flowchart of a method for updating firmware.
Figure 5:
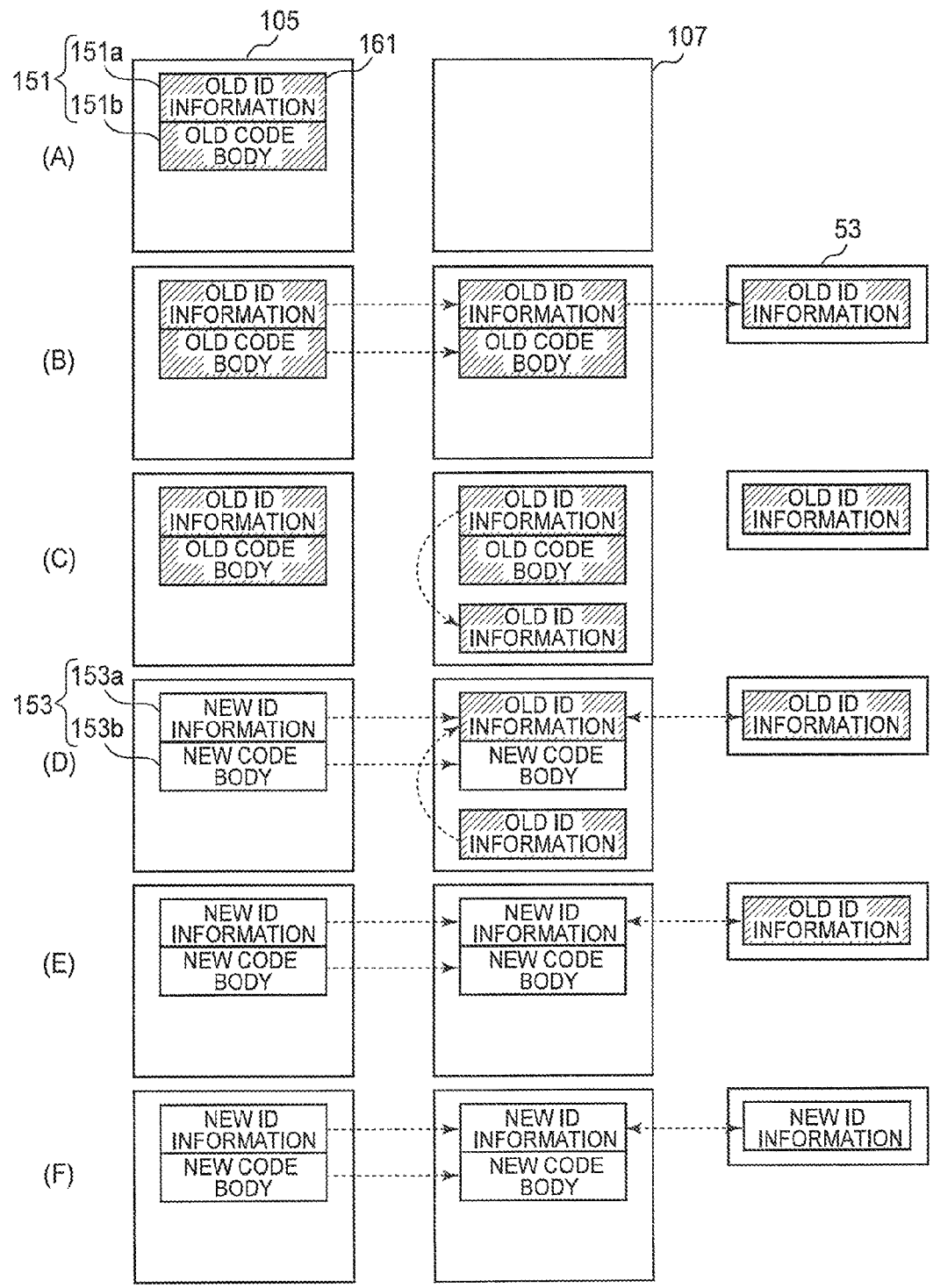
FIG. 5 illustrates the state of identification information corresponding to the flowchart of FIG. 4.

Referring next to FIGS. 4 and 5, the procedure by the HDD 100 of power-on updating of firmware is described below. FIG. 4 is a flowchart of the operational procedure of the computer 10, and FIG. 5 is a block diagram showing the state of identification information that the NVRAM 105, the DRAM 107 and the OS 53 have. The OS 53 stores identification information at the system memory 13. That is, the identification information that the OS has disappeared when the power supply of the system memory 13 stops. The identification information disappearing when shifting to the hibernation state is then restored again to the system memory 13 at the time of resumption.

At block 201, the computer 10 is in the power-off state, and the NVRAM 105 stores old firmware 151 that was updated in the past (FIG. 5(A)). The old firmware 151 is made up of identification information 151*a* and a code body 151*b*. Since the HDD 100 is in the power-off state, firmware is not loaded in the DRAM 107, and the OS 53 is not loaded in the system memory 13 on the system side as well.

At block 203, when the power supply of the computer 10 is turned on, the CPU 11 executes the UEFI 56 and starts cold boot. In the cold boot, the UEFI 56 performs complete POST to detect, inspect and configure all of the devices, and then starts to load the OS and an application program. At block 205, the HDD 100 whose power supply is turned on performs power-on reset. The CPU 103 that is power-on reset executes the microcode of the ROM 109, and at block 207 the CPU loads the old firmware 151 into a predetermined address of the DRAM 107.

When the control of the CPU 103 is transferred to the old firmware 151 loaded, the old firmware 151 is activated to be in the execution state. Before the boot completes, the OS 53 loaded in the system memory 13 sends IDENTIFY DEVICE command to the HDD 100. After receiving the command, the code body 151*b* sends back the old identification information 151*a* to the OS 53 at block 209 (FIG. 5(B)). The OS 53 then stores the received old identification information 151*a* in the system memory 13 so as to check whether or not the HDD 100 has been changed. At block 211, the boot ends, and the computer 10 transitions to the power-on state.

In the power-on state, since the identification information 151*a* stored in the DRAM 107 and the identification information 151*a* that the OS 53 acquires during the cold boot agree with each other, even when the OS 53 issues IDENTIFY DEVICE command after the cold boot ends and acquires identification information, the OS 53 recognizes that the HDD 100 attached at the time of the cold boot has not been changed, and so the OS 53 does not display blue screen.

At block 213, a user executes the update program 51 and starts an operation to update the old firmware 151 with new firmware 153 that is acquired via a network or a recording medium. At block 215, the update program 51 issues an ATA command of DOWNLOAD MICROCODE. Old code body 151*b* that is being executed at the DRAM 107 that receives the ATA command saves the old identification information 151*a* at a predetermined address of the DRAM 107 (FIG. 5(C)), and the new firmware 153 is written at the firmware area 161 of the NVRAM 105. The order of saving and writing may be reversed.

The new firmware 153 may be written so as to overwrite the old firmware 151, or may be written at a different area so as to leave the old firmware 151 intact (FIG. 5(D)). At block 217, the old code body 151*b* finishes writing and sends a reset signal to the CPU 103 for CPU reset. Since the CPU reset does not reset the DRAM 107 unlike the power-on reset, the content of the old firmware 151 loaded in the DRAM 107 is kept.

At block 219, the CPU 103 reset executes the microcode of the ROM 109, and loads the new firmware 153 at a predetermined address of the DRAM 107 where the old firmware 151 is loaded. After the loading has been completed, the control of the CPU 103 is transferred to the new firmware 150*b*, and the new firmware is activated. At block 221, a new body code 153*b* of the new firmware 153 overwrites new identification information 153*a* with the old identification information 151a that is saved at the predetermined address of the DRAM 107.

Since the new identification information 153a is rewritten with the old identification information 151a, the new code body 153b can send back the old identification information 151a by the same procedure as that of sending back the new identification information 153a when the OS 53 requests identification information. This is not a limiting example, and the new body code 153b may send back the old identification information 151a saved in response to a request from the OS 53 as long as the old identification information 151a saved is stored in the DRAM 107. In this case, the new body code 153b has to change the address of identification information that is sent back to the OS 53 between before and after resetting of the DRAM 107.

At block 223, when the system then transitions to the suspend state or the hibernation state before resumption, the procedure shifts to block 251, and when such a state does not occur, the procedure shifts to block 225. At block 225, the OS 53 sends an ATA command to the HDD 100 to request identification information. Receiving the ATA command, the new code body 153b sends back the old identification information 151a to the OS 53 at block 227 (FIG. 5(D)). Since the old identification information 151a that the OS 53 has and the old identification information 151a that the new code body 153b sends back in this state, the OS 53 recognizes that the HDD 100 at the time of the cold boot has not been changed.

In this way, the HDD 100 executes firmware including the old identification information 151a and the new code body 153b. Herein, the manufacturer of the HDD guarantees so that update of firmware is performed only at a part that does not affect the operation of the OS 53, and so any trouble of the computer 10 will not occur during the operation. At block 251, the system performs warm boot, and then the HDD 100 is power-on reset.

Although the firmware stored in the DRAM 107 of the HDD 100 disappears at the time of warm boot, the old identification information 153a that the OS 53 acquires at block 209 is kept at the system memory 13 or is restored at the time of resumption. At block 253, the CPU 103 is power-on reset, and executes the microcode of the ROM 109 to load the new firmware 153. At block 255, when the OS 53 requests identification information, the new body code 153b sends back the new identification information 153a to the OS 53 at block 257.

At block 259, since the old identification information 151a that the OS 53 has and the new identification information 153a that the new code body 153b sends back do not agree with each other, the OS 53 determines that the HDD 100 recognized at the time of the cold boot has been changed, and displays a blue screen (FIG. 5(E)). At block 223, the case of warm boot only is described, and resumption from other power states such as the run time D3 where the HDD 100 is power-on reset in the power-on state, or the power state such that, although the OS 53 recognizes it as transition to the suspend state, it actually transitions to the hibernation state, the same procedure as that for warm boot may be performed. When cold boot is performed at block 203 following block 227 or ID block 259, the new firmware 153 is loaded (FIG. 5(F)), and the OS 53 also acquires the new identification information 153b during the boot duration.

IV. Update Method 2

Figure 6:
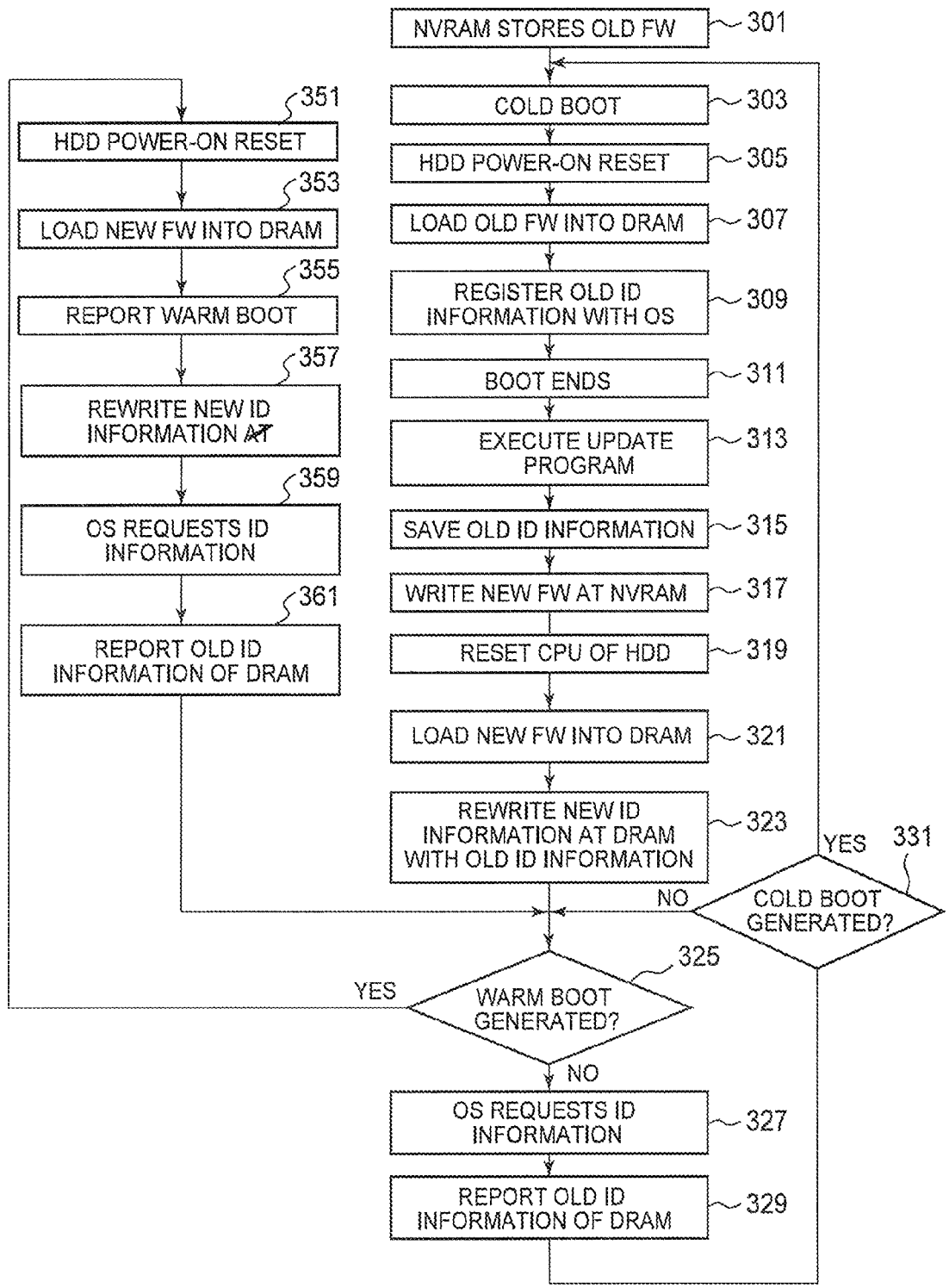
FIG. 6 is a flowchart of another method for updating firmware.
Figure 7:
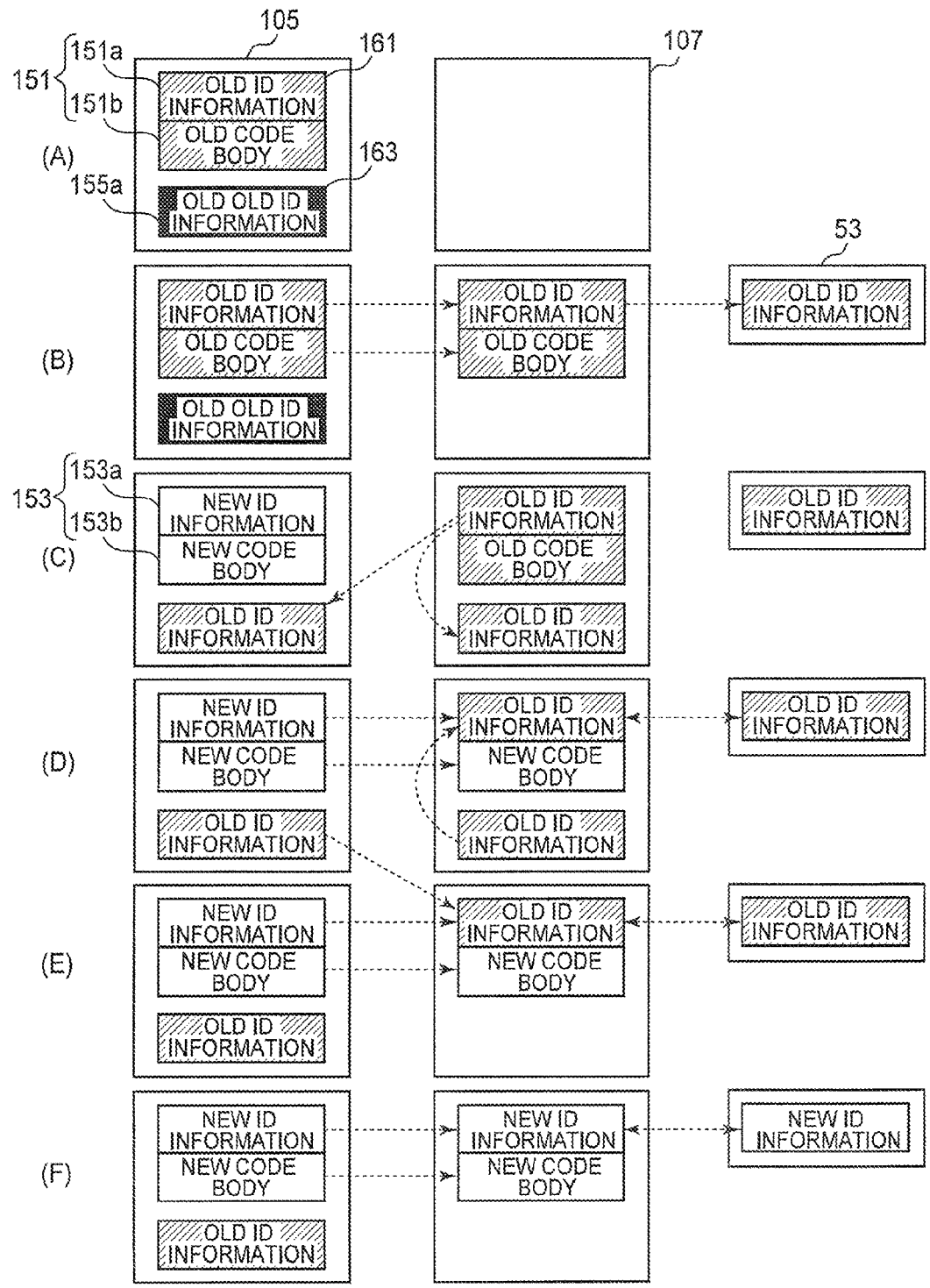
FIG. 7 illustrates the state of identification information corresponding to the flowchart of FIG. 6.

Update method 1 is not capable of dealing with warm boot, and an improved update method capable of dealing with warm boot is described below. FIG. 6 is a flowchart of the operational procedure of the computer 10, and FIG. 7 is a block diagram showing the state of identification information that the NVRAM 105, the DRAM 107 and the OS 53 have. Since some of the steps of FIG. 6 are common to the steps of FIG. 4 (for example, FIG. 7(A) to 7(F) corresponds to FIG. 5(A) to 5(F)), only the differences are explained as follows.

At block 301, the NVRAM 105 stores old firmware 151 that was updated in the past in the firmware area 161, and stores old old identification information 155a that was updated the last time before that at a save area 163 (FIG. 7(A)). Since the old old identification information 155a is not involved from block 303 to block 313, the procedure is the same as from block 203 to block 213 of FIG. 4 (FIG. 7(B)). At block 315, the update program 51 issues an ATA command of DOWNLOAD MICROCODE.

Old code body 151b being executed that receives the ATA command overwrites the content of the save area 163 of the NVRAM 105 with the old identification information 151a, saves the old identification information 151a at a predetermined address of the DRAM 107, and then writes new firmware 153 received from the system at a firmware area 161 at block 317 (FIG. 7(C)). The save area 163 may be provided at a storage medium different from the NVRAM 105. Since the old identification information 151a is saved at the save area 163 of the NVRAM 105 as well, the old identification information does not necessarily have to be saved in the DRAM 107.

The procedure from block 319 to block 329 is the same as the procedure from block 217 to block 227 of FIG. 4 (FIG. 7(D), (F)). At block 331, the procedure returns to block 325 unless cold boot occurs, and when cold boot occurs, the procedure returns to block 303. At block 351, the HDD 100 is power-on reset, and at block 353, the microcode at the ROM 109 loads the new firmware 153 stored at the firmware area 161 into the DRAM 107. The CPU 11 of the reset system executes the UEFI 56 in parallel with the operation of the HDD 100 to start warm boot. When the HDD 100 becomes accessible from the system, the device driver 55 of the HDD 100 sends a ready signal to the UEFI 56.

Receiving the ready signal from the device driver 55, the UEFI 56 refers to the ACPI register 31 at block 355 to recognize it as warm boot, and sends a predetermined command or event information indicating warm boot to the HDD 100. Receiving the event information indicating warm boot, the new firmware 153 loads the old identification information 151a saved at the save area 163 to overwrite new identification information 153a with it at block 357 (FIG. 7(E)). As a result, when the OS 53 requests identification information at block 359, a new body code 153b sends back old identification information 151b at block 361, and so the OS does not display blue screen. Update method 1 and update method 2 can implement power-on update simply by changing firmware and the UEFI 56 partially.

In this procedure, after updating to the new firmware 153 and when the procedure returns from block 331 to block 303, the old identification information 151a is written at the save area 163 (FIG. 7(F)). As a result, at block 301, the old old identification information 155a that is one generation ago is written at the save area 163 (FIG. 7(A)). The procedure is not limited to this, and the new firmware 153 may rewrite the content at the save area 163 with the new identification information 153a when cold boot occurs. In that case, the old identification information 151a is written at the save area 163 at block 301. This procedure makes the identification information at the firmware area 161 and the identification information at the save area 163 agree with each other after cold boot, and so can skip the rewriting procedure of the identification information, at the save area 163 that is performed at block 315.

V. Update Method 3

Figure 8:
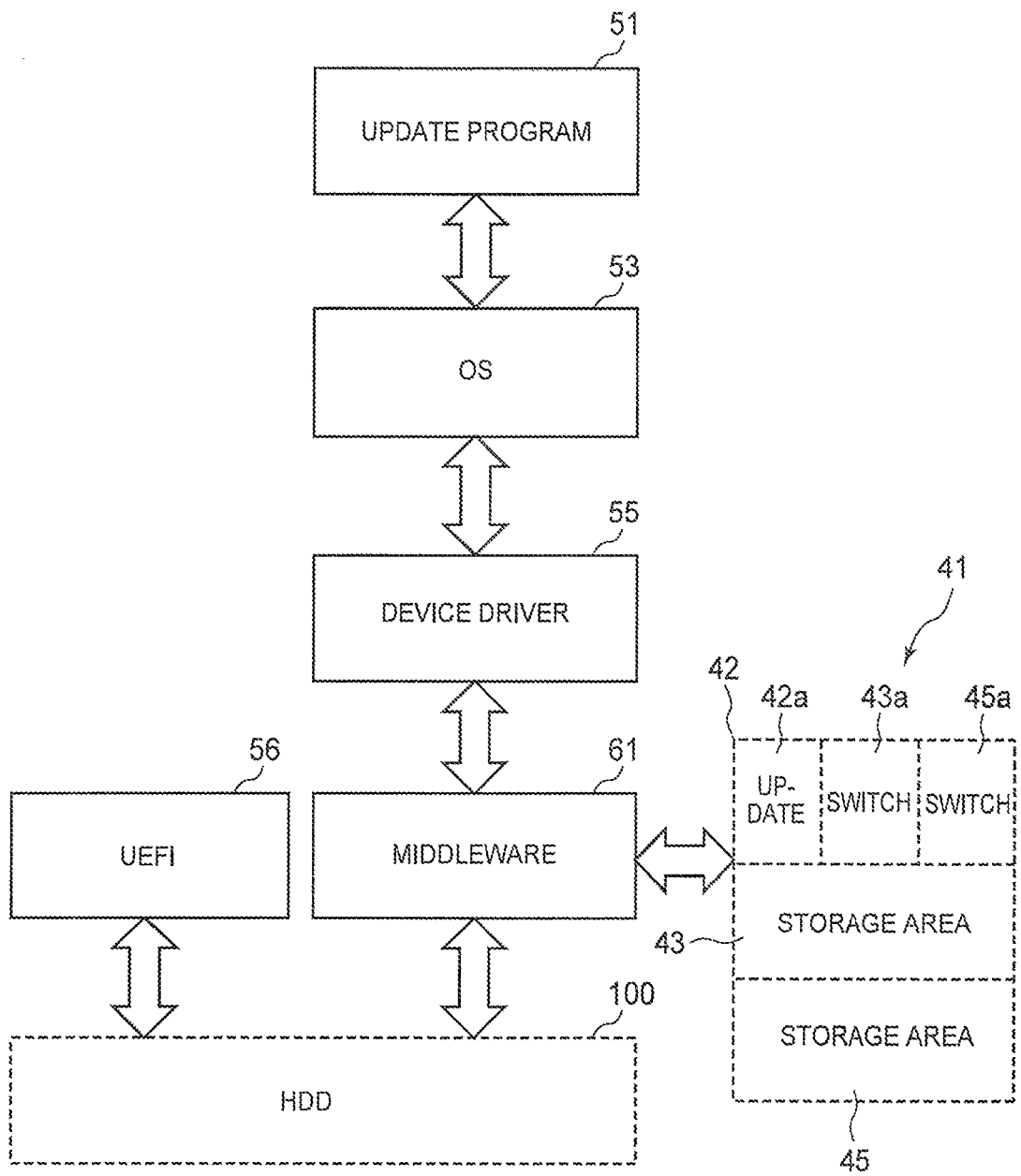
FIG. 8 is a functional block diagram of the software configuration for a method for updating firmware by a system.
Figure 9:
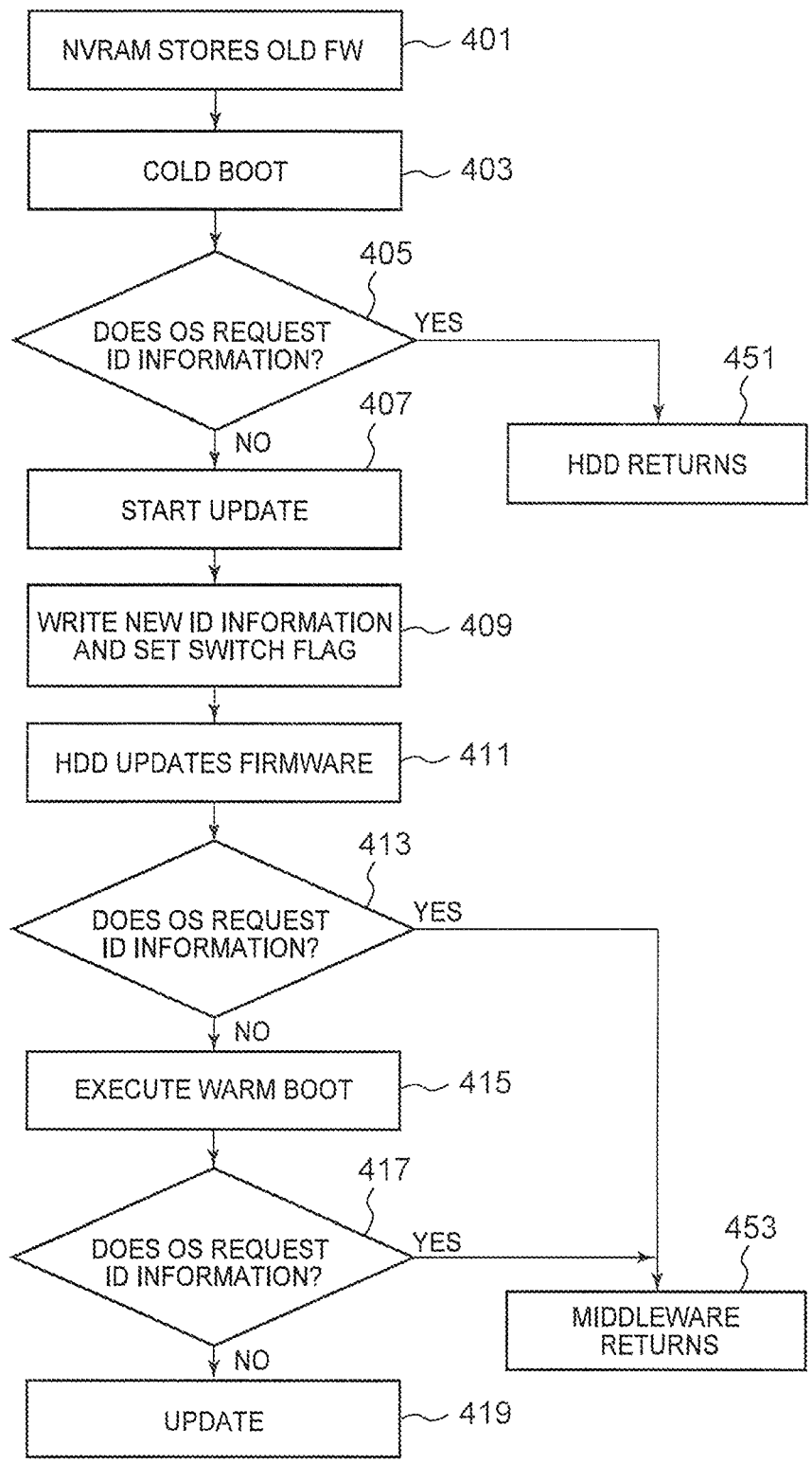
FIG. 9 is a flowchart of a method for updating firmware by a system that supports warm boot.
Figure 10:
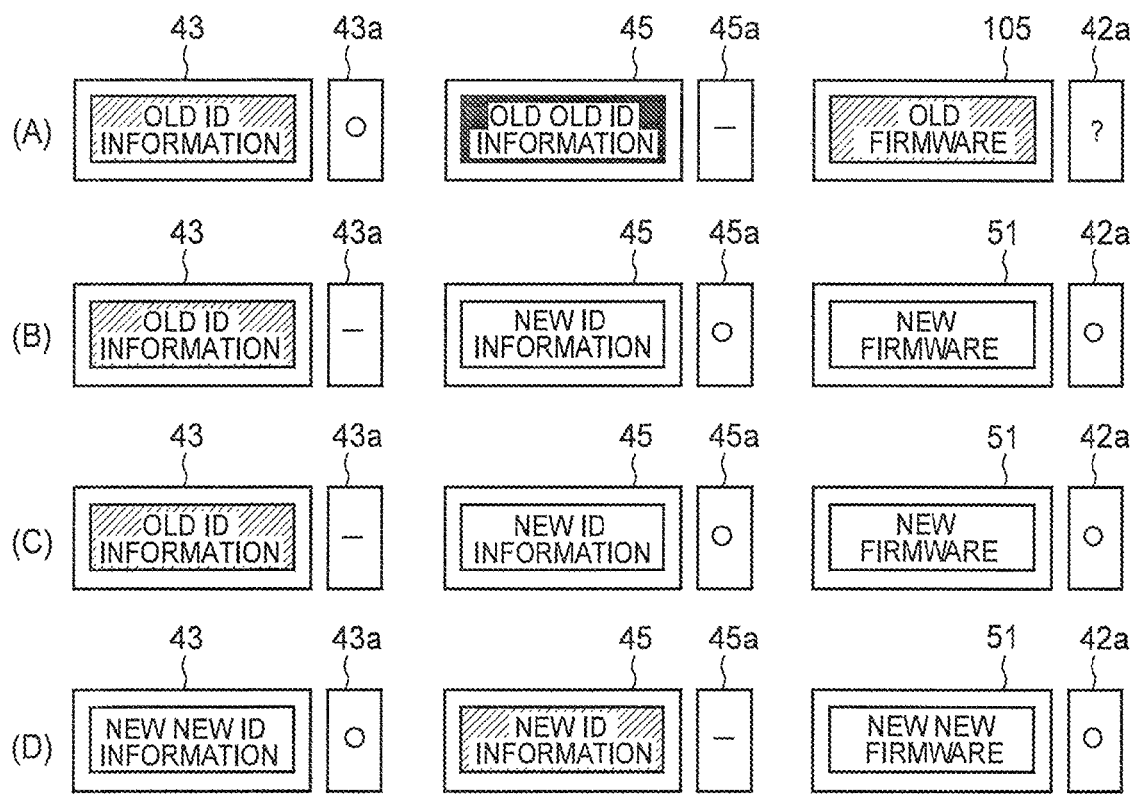
FIG. 10 illustrates the state of identification information, corresponding to the flowchart of FIG. 9.

Referring now to FIGS. 8 to 10, a method of implementing power-on update on the system side is described. FIG. 8 describes the configuration of software of the computer 10 to implement power-on update. FIG. 9 is a flowchart thereof and FIG. 10 illustrates the storage state of identification information at a NVRAM 41 of the system and the NVRAM 105 of the HDD 100. FIG. 8 is different from FIG. 2 in that a middleware 61 is provided at a layer lower of the device driver 55, and the NVRAM 41 connected to the PCH 17 is provided so that the middleware 61 can access it. The OS 53 and the device driver 55 do not have to be changed, and the middleware 61 may be inserted between the device driver 55 and the OS 53.

The NVRAM 41 is provided with a flag area 42 and two storage areas 43, 45. An update flag 42a and switch flags 43a and 45a are configured at the flag area 42, and identification information of firmware of the HDD 100 is stored at the storage areas 43, 45. The switch flags 43a and 45a indicate relative newness of the identification information stored at their corresponding storage areas 43 and 45, respectively. The middleware 61 configures the update flag 42a when it detects an ATA command to upload. firmware that the update program 51 issues, and cancels the update flag 42a when receiving a notification of cold boot from the UEFI during boot.

At one of the storage areas 43 and 45, identification information of firmware that the NVRAM 105 of the HDD 100 currently stores is stored, and at the other area, identification information of firmware that was updated the last time before that is stored. When configuring the update flag 42a, the middleware 61 writes new identification information of new firmware that is sent following the ATA command at a storage area at which the switch flag is not configured, configures a switch flag corresponding to the storage area after writing, and cancels the switch flag corresponding to the other storage area.

As a result, one of the switch flags 43a and 45a only is configured corresponding to any one of the storage areas 43 and 45 that stores relatively new identification information. When the update flag 42a is not configured, the middleware 61 lets a command and data that are exchanged between the system and the HDD 100 pass therethrough without processing them at all. The middleware 61 does not pass, to the HDD 100, an. ATA command from the OS to request identification information that is received when the update flag 42a is configured, and the middleware itself refers to the NVRAM 41 and sends back it.

Referring next to the flowchart of FIG. 9, the following describes a method of power-on update of firmware of the HDD 100 by the system. At block 401, the computer 10 is in the power-off state, and the NVRAM 105 of the HDD 100 stores old firmware. Identification information of old firmware is stored at the storage area 43, and identification information of the firmware that was updated previously is stored at the storage area 45. The switch flag 43a is configured and the switch flag 45a is cancelled, corresponding to the newness of the identification information. The update flag 42a is indefinite because it may have different states between before and after cold boot (FIG. 10(A)).

At block 403, the system executes cold boot and transitions to the power-on state. Receiving a notification of cold boot from the UEFI 56, the middleware 61 cancels the update flag 42a if it is configured. At block 405, the middleware 61 detects an ATA command to acquire identification information that the OS 53 issues, confirms the cancellation of the update flag 42a, and sends the ATA command to the HDD 100 at block 451. When. the HDD 100 sends back old identification information in response to it, the OS 53 does not display blue screen because identification information acquired during cold boot and identification information received from the HDD 100 after boot completion agree.

At block 407, the update program 51 starts to update the firmware. At block 409, the middleware 61 sends the ATA command and new firmware to the HDD 100, and the middleware itself overwrites the content at the storage area 45 where the switch flag 45a is cancelled with the identification information that is sent following the detection of the ATA command indicating the update, cancels the switch flag 43a and configures the switch flag 45a. The middleware 61 further configures the update flag 42a.

At block 411, the HDD 100 that receives the ATA command updates the firmware. The identification information at the storage area 45 agrees with new identification information of the new firmware that the HDD 100 stores (FIG. 10(B)). At block 413, the middleware 61 detects the ATA command that the OS 53 issues to acquire identification information and confirms that the update flag 42a is configured. Then the middleware does not pass the ATA command to the HDD 100, and sends back old identification information at the storage area 43 at which the switch flag 43a is not configured at block 453. Since the identification information that the OS 53 acquires during cold boot and the identification information that the OS 53 acquires after boot completion agree, the OS does not display blue screen.

At block 415, the system executes warm boot. The middleware 61 does not so receive a notification of cold boot from the UEFI 56 during warm boot, and so does not cancel the update flag 42a (FIG. 10(C)). That is, even when the OS 53 requests identification information from. the HDD 100 after warm boot is completed, the OS does not display blue screen because of a response of the middleware 61. At block 419, when update occurs again, identification information of the further updated firmware is stored at the storage area 43 that stores old identification information, the switch flag 43a is configured, and the switch flag 45a is canceled (FIG. 10(D)).

That is the description of a method of power-on update by the system using the NVRAM 41, and the method can be implemented by providing an update flag and a storage area at the system memory 13 instead of the NVRAM 41. Then, at the storage area of the system memory 13, old identification information that is acquired from the device driver 55 during updating is stored. In this case, since the content stored in the system memory 13 is kept when warm boot occurs after update, the old identification information can be sent back. When cold boot occurs, the update flag is cancelled, and the middleware 61 is not involved in sending back of the identification information. However, blue screen is not displayed as described above.

As has been described, the present disclosure provides a method for updating firmware of an electronic device, such as a HDD, within a computer.

While the disclosure has been particularly shown and described with reference to a preferred embodiment, it will be understood by those skilled in the art that various changes in form and detail may be made therein without departing from the spirit and scope of the disclosure.

What is claimed is:

1. A method comprising:
in response to a firmware update request on a computer in a power-on state,
copying an old identification information of an old firmware located in a volatile memory of an electronic device within said computer to a different address location of said volatile memory of the electronic device; and
storing new firmware in a non-volatile memory of said electronic device within said computer;
replacing said old firmware in said volatile memory with said new firmware from said non-volatile memory of said electronic device to allow said new firmware to take control of said computer; and
replacing a new identification information of said new firmware with said old identification information of said old firmware previously stored in said different address location of said volatile memory of said electronic device to allow said new firmware to be executed under a new code body along with said old identification information of said old firmware before a cold boot of said computer.

2. The method of claim 1, further comprising loading said new firmware from said non-volatile memory to said volatile memory after a warm boot of said computer.

3. The method of claim 2, further comprising presenting a blue screen after reporting said new identification information of said new firmware to an operating system requesting identification information.

4. The method of claim 1, further comprising transferring said new identification information from said volatile memory to said operating system after a cold boot of said computer.

5. The method of claim 1, wherein said electronic device complies with Advanced Technology Attachment (ATA) specifications, and said identification information is data to be sent in response to an ATA IDENTIFY DEVICE command from said operating system.

6. The method of claim 1, wherein said electronic device is a hard disk drive.

7. The method of claim 1, wherein said old firmware includes an old code body and said old identification information, and said new firmware includes said new code body and said new identification information.

8. A computer comprising:
an electronic device having a volatile memory and a non-volatile memory;
a system memory connected to said electronic device;
a processor, in response to a firmware update request when said computer is in a power-on state,
copies an old identification information of an old firmware located in said volatile memory to a different address location of said volatile memory:
stores new firmware in said non-volatile memory;
replaces said old firmware in said volatile memory with said new firmware from said non-volatile memory to allow said new firmware to take control of said computer; and
replaces a new identification information of said new firmware with said old identification information of said old firmware previously stored in said different address location of said volatile memory to allow said new firmware to be executed under a new code body along with said old identification information of said old firmware before a cold boot of said computer.

9. The computer of claim 8, wherein said new firmware is loaded from said non-volatile memory to said volatile memory after a warm boot of said computer.

10. The computer of claim 9, wherein a blue screen is presented after said new identification information of said new firmware has been presented to an operating system requesting identification information.

11. The computer of claim 8, wherein said new identification information is transferred from said volatile memory to said operating system after a cold boot of said computer.

12. The computer of claim 8, wherein said electronic device complies with Advanced Technology Attachment (ATA) specifications, and said identification information is data to be sent in response to an ATA IDENTIFY DEVICE command from said operating system.

13. The computer of claim 8, wherein said electronic device is a hard disk drive.

14. The computer of claim 8, wherein said old firmware includes an old code body and said old identification information, and said new firmware includes said new code body and said new identification information.

* * * * *